Oct. 26, 1954
H. V. REED ET AL
2,692,663
ONE-PIECE BRAKE BAND
Filed July 30, 1949
2 Sheets-Sheet 1
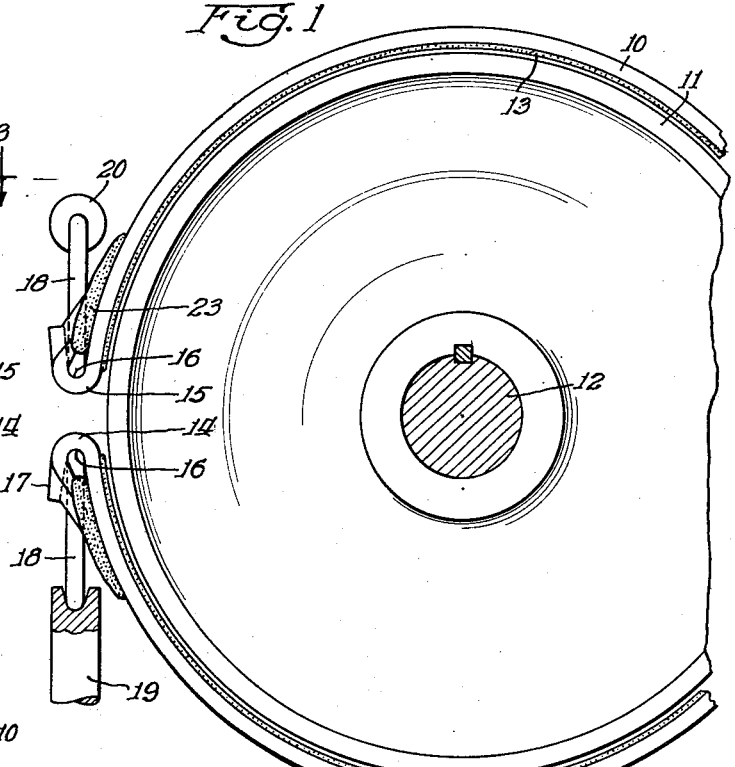
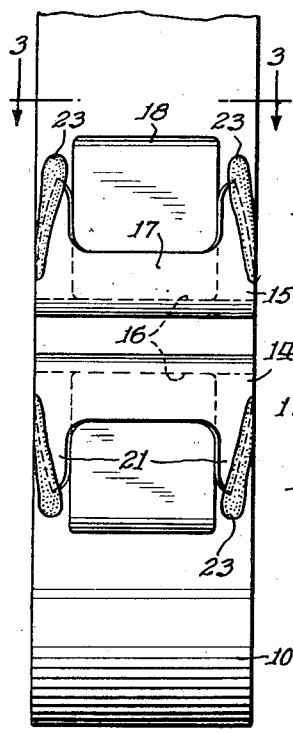
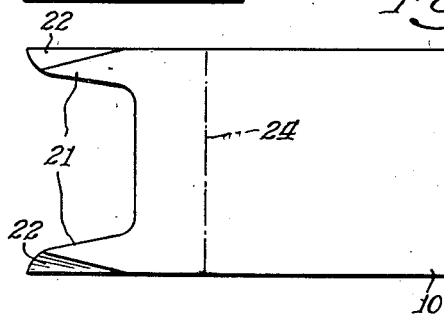
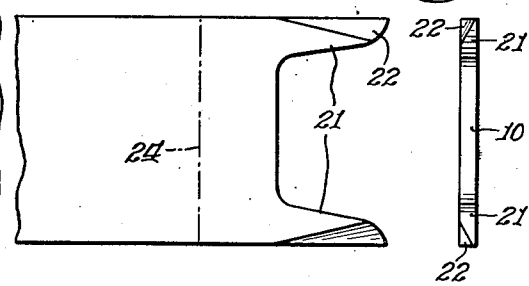
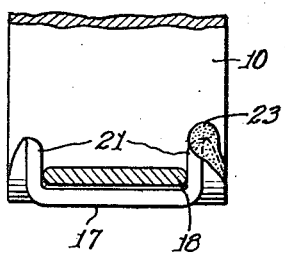
Inventors:
Harold V. Reed and
Richard L. Smirl Oct. 26, 1954  H. V. REED ET AL  2,692,663
ONE-PIECE BRAKE BAND
Filed July 30, 1949  2 Sheets-Sheet 2
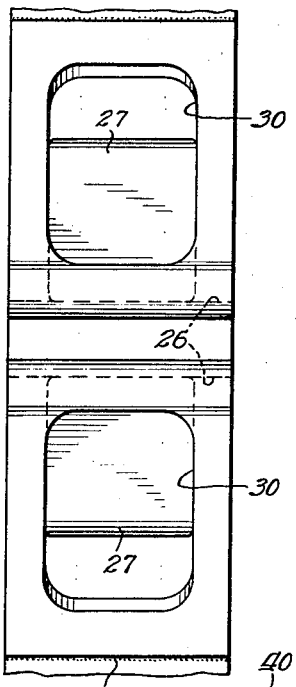
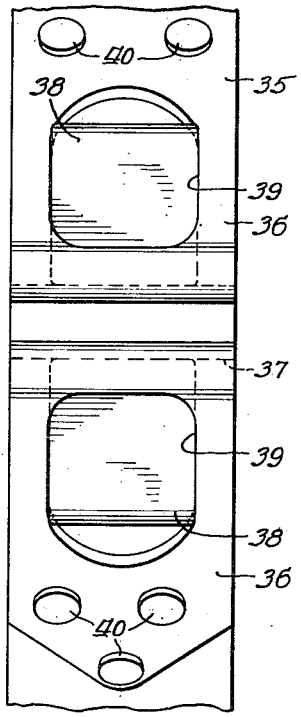
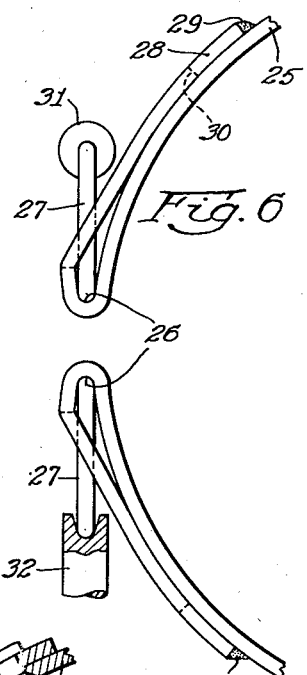
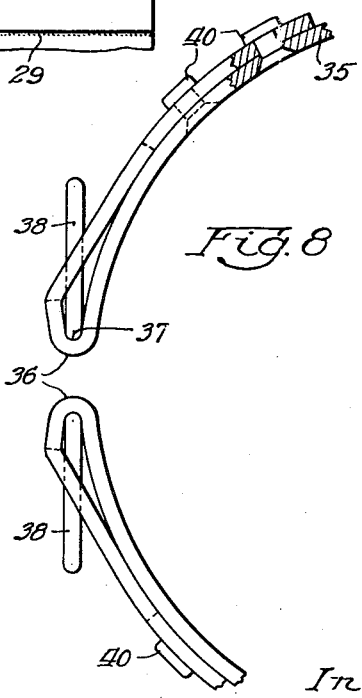
Inventors:
Harold V. Reed and
Richard L. Smirl Patented Oct. 26, 1954

2,692,663

UNITED STATES PATENT OFFICE 2,692,663

ONE-PIECE BRAKE BAND

Harold V. Reed, Chicago, and Richard L. Smirl, La Grange, Ill., assignors to Borg-Warner Corporation, Chicago, Ill., a corporation of Illinois Application July 30, 1949, Serial No. 107,656

1 Claim. (Cl. 188—259)

Our invention relates to brakes and, more particularly, to brake bands.

It is an object of our invention to provide an improved brake band of the type having slots or pockets in both ends for receiving force-applying struts for engaging the band.

More particularly, it is an object of the invention to provide an improved brake band of this type having strut-receiving pockets in its ends which are formed by return bent end portions of the band that are fixed as by welding or riveting to the band.

The invention consists of the novel constructions, arrangements and devices to be hereinafter described and claimed for carrying out the above-stated objects and such other objects as will appear from the following description of preferred embodiments of the invention illustrated with reference to the accompanying drawings, wherein:

Fig. 1 is an elevational view of a brake band disposed on a brake drum and embodying the principles of the invention;

Fig. 2 is a side view of the band illustrated in Fig. 1;

Fig. 3 is a sectional view taken on line 3—3 of Fig. 2;

Fig. 4 is a plan view of a blank for the band;

Fig. 5 is a side view of the blank shown in Fig. 4;

Fig. 6 is a fragmentary elevational view of a band constituting a modification of the invention;

Fig. 7 is a side view of the band shown in Fig. 6;

Fig. 8 is a fragmentary elevational view of a brake band constituting another embodiment of the invention; and Fig. 9 is a side view of the band shown in Fig. 8.

Like characters of reference designate like parts in the several views.

Referring now in particular to Figs. 1 to 3 of the drawings, a circular brake band 10 is illustrated as disposed on a cylindrical brake drum 11 fixed to a shaft 12. A lining 13 of suitable friction material is fixed within the band proper which is of a suitable metal. The lining is adapted to contact the drum 11 and form the actual braking surface for the drum. The band 10 has two ends 14 and 15 which are adapted to be moved together so as to contract the band on the drum and thereby brake the drum.

Each of the ends 14 and 15 of the band is provided with a pocket 16 which is formed by an outwardly return bent end portion 17 of the band. Each of the pockets 16 is adapted to receive a strut 18, and force may be applied to the struts 18 by any suitable means, such as the movable part 19 acting on one strut and a fixed part 20 holding the other strut, for forcing the ends of the band together to contract the band on the drum. The inherent resiliency of the band itself is relied on to disengage the band.

The band on each end is provided with a pair of wings 21 which have chamfered surfaces 22 on their outer edges. Each end portion 17 is bent back along the band, with the chamfered faces 22 of the wings 21 being in contact with the outer surface of the band but with the end portion 17 proper out of contact with the outer surface of the band to form the pocket 16 for a strut 18. The wings 21 are each welded to the outer surface of the band as at 23 and form the sides of the pocket 16.

The brake band may be formed by first bending the blank shown in Fig. 4 into circular form. The blank shown is simply a portion of a strip of metal formed with the wings 21 on opposite ends. The end portions 17 may then be bent back along the lines 24 to bring the wings 21, and particularly their chamfered surfaces 22, into contact with the outer surface of the band. The wings are then welded as at 23, and the band is then heat treated by shaping it on a round drum (not shown) and heating it to give to it its final symmetrical shape. The friction lining 13 is then glued or otherwise fastened inside the band.

The brake band 25 shown in Fig. 6, constituting another embodiment of the invention, comprises end pockets 26 for receiving struts 27 which are formed by end portions 28 bent backwardly into contact with the outer surface of the band. The end portions 28 are considerably longer than the end portions 17 in the first embodiment of the invention and are welded at their extreme ends as at 29 to the outer surface of the drum. The end portions 28 are each provided with an opening or window 30 through which the struts 27 may extend. The band shown in Figs. 6 and 7 may be made in substantially the same way as the band shown in Figs. 1 to 3 and may be used in substantially the same manner with the two struts 27 disposed in the opposite pockets 26 and acted on by a stationary part 31 and a movable part 32, for example, to tighten the band on a drum.

The brake band 35 shown in Fig. 8 is quite similar to that shown in Figs. 6 and 7, except that it is of riveted rather than welded construction.

The brake band 35 comprises end portions 36 bent backwardly into contact with the outer surface of the band to form pockets 37 for receiving band-operating struts 38. The end portions 36 are provided with windows 39 through which the struts 38 extend, and the end portions are riveted as at 40 to fix the end portions with respect to the band proper. It will be noted that, in this embodiment, the end portions 36 are somewhat longer than the end portions 28 in the embodiments shown in Figs. 6 and 7, and this is for the purpose of allowing the use of three rivets 40 which consume more space than the welding shown in Figs. 6 and 7.

Our improved brake bands are advantageously provided with strut-receiving pockets formed by return bent portions of the bands which obviate the necessity for separate strut-receiving end pieces that must be fixed to the band ends. It is contemplated that the illustrated bands shall supply their own releasing force due to their resiliency, so that the pockets which loosely receive the struts are sufficient for operation of the bands, and no band-strut connection which allows the struts to pull the band open under force applied to the struts is necessary. In each of the constructions, the strut-receiving pockets are so made that there is substantially as much strength in the band at these points as in the other portions of the bands, even though the pockets are formed by parts integral with the rest of the bands.

We wish it to be understood that our invention is not to be limited to the specific constructions and arrangements shown and described, except only insofar as the claim may be so limited, as it will be understood to those skilled in the art that changes may be made without departing from the principles of the invention.

We claim:

A brake band having two ends adapted to have force applied thereto for decreasing the diameter of the band to apply it on a drum, said band including an end portion of the band bent outwardly and back upon itself to form a pocket for receiving a band-actuating strut, said end portion including two wings of greater length than the remainder of the end portion, said wings being chamfered to a less thickness on the outer edges to provide chamfered edge faces on the wings which abut and are in contact with the outer surface of the drum, and welds for fixing each of said wings to the outer surface of the band.

References Cited in the file of this patent

UNITED STATES PATENTS

| Number | Name | Date |
|---|---|---|
| 294,672 | Proctor et al. | Mar. 4, 1884 |
| 894,426 | Dolson et al. | July 28, 1908 |
| 1,315,699 | Beck | Sept. 9, 1919 |
| 1,529,087 | Reynolds | Mar. 10, 1925 |
| 1,572,226 | Burke | Feb. 9, 1926 |
| 1,614,084 | Reiner | Jan. 11, 1927 |
| 1,736,913 | Harry | Nov. 26, 1929 |
| 1,831,312 | McCune | Nov. 10, 1931 |